(12) United States Patent
Basu et al.

(10) Patent No.: US 8,086,899 B2
(45) Date of Patent: Dec. 27, 2011

(54) DIAGNOSIS OF PROBLEM CAUSES USING FACTORIZATION

(75) Inventors: Sumit Basu, Seattle, WA (US); John Dunagan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/731,148

(22) Filed: Mar. 25, 2010

(65) Prior Publication Data

US 2011/0239051 A1    Sep. 29, 2011

(51) Int. Cl.
*G06F 11/00* (2006.01)
(52) U.S. Cl. .................................. 714/26; 714/47.3
(58) Field of Classification Search ............. 714/25, 714/26, 47.1, 47.2, 47.3; 702/181, 183
See application file for complete search history.

(56) References Cited

U.S. PATENT DOCUMENTS

| | | | |
|---|---|---|---|
| 5,596,712 A * | 1/1997 | Tsuyama et al. ........... | 714/26 |
| 6,519,552 B1 | 2/2003 | Sampath et al. | |
| 6,738,933 B2 | 5/2004 | Fraenkel et al. | |
| 6,845,342 B1 * | 1/2005 | Basser et al. ............. | 702/183 |
| 7,401,263 B2 * | 7/2008 | Dubois et al. ............ | 714/47 |
| 7,409,593 B2 * | 8/2008 | Aaron ..................... | 714/26 |
| 7,484,132 B2 * | 1/2009 | Garbow .................. | 714/47 |
| 7,583,587 B2 | 9/2009 | Qiu et al. | |
| 7,590,513 B2 | 9/2009 | Jiang et al. | |
| 7,676,695 B2 * | 3/2010 | Bennett et al. ........... | 714/26 |
| 7,774,657 B1 * | 8/2010 | Hardman ................. | 714/47 |
| 7,788,536 B1 * | 8/2010 | Qureshi et al. ........... | 714/38.14 |
| 2003/0065986 A1 * | 4/2003 | Fraenkel et al. .......... | 714/47 |
| 2005/0015667 A1 * | 1/2005 | Aaron ..................... | 714/25 |
| 2006/0265625 A1 * | 11/2006 | Dubois et al. ............ | 714/6 |
| 2007/0242611 A1 | 10/2007 | Archer et al. | |
| 2008/0140362 A1 | 6/2008 | Gross et al. | |
| 2008/0276137 A1 * | 11/2008 | Lin et al. ................. | 714/57 |
| 2008/0307269 A1 * | 12/2008 | Bennett et al. ........... | 714/47 |

OTHER PUBLICATIONS

Bodik, et al., "Fingerprinting the Datacenter: Automated Classification of Performance Crises", Dec. 2008, Retrieved at << http://www.cs.berkeley.edu/~bodikp/publications/sysml08.pdf >>, pp. 1-14.

Cecchet, et al., "Performance Debugging in Data Centers: Doing More with Less", Proceedings of the First international conference on Communication Systems and Networks , 2009, Retrieved at << http://ieeexplore.ieee.org/xpl/freeabs_all.jsp?arnumber=4808877 >>, pp. 9.

(Continued)

*Primary Examiner* — Robert Beausoliel, Jr.
*Assistant Examiner* — Elmira Mehrmanesh

(57) ABSTRACT

Technology is described for diagnosing problem causes in complex environments by using factorization of a plurality of features. An embodiment can include the operation of identifying a plurality of entities having entity weighting parameters. The entities may be computing devices. The plurality of features can be associated with a respective entity having feature weighting parameters, and an instance of the plurality of features can be associated with individual entity instances. A fault label can be applied for an ensemble entity. The plurality of features can be linked using the feature weighting parameter and the entity weighting parameter with a bilinear model. A further operation is estimating weighting values for the entity weighting parameters and the feature weighting parameters for use in a statistical model. The meaningful feature parameters can be found for the statistical model that are likely to be responsible for entity faults.

20 Claims, 13 Drawing Sheets

OTHER PUBLICATIONS

Middleton, et al., "Probabilistic Diagnosis Using a Reformulation of the Internist-1/QMR Knowledge Base", Retrieved at << http://ksl.stanford.edu/pub/KSL_Reports/KSL-90-68.ps.gz >>, pp. 40, 1991.

Dyrholm, et al., "Bilinear Discriminant Component Analysis", Journal of Machine Learning Research, vol. 8, 2007, Retrieved at << http://jmlr.csail.mit.edu/papers/volume8/dyrholm07a/dyrholm07a.pdf >>, pp. 15.

Listgarten, et al., "Determining the Number of Non-Spurious Arcs in a Learned DAG Model", Retrieved at << http://ftp.research.microsoft.com/pub/tr/TR-2007-60.pdf >>, pp. 8. 2007.

Jaakkola, et al., "Variational Probabilistic Inference and the QMR-DT Network", Journal of Articial Intelligence Research, vol. 10, Issue 1, 1999, Retrieved at << http://www.jair.org/media/583/live-583-1781-jair.ps >>, pp. 32.

Konno, et al., "Development of a clinical diagnosis support tool to identify patients with lumbar spinal stenosis", vol. 16, No. 11, Nov. 2007, Retrieved at << http://www.ncbi.nlm.nih.gov/pmc/articles/PMC2223350/pdf/586_2007_Article_402.pdf >>, pp. 1951-1957.

Lu, et al., "MUVI: Automatically Inferring Multi-variable Access Correlations and Detecting Related Semantic and Concurrency Bugs", Proceedings of twenty-first ACM SIGOPS symposium on Operating systems principles, ACM Symposium on Operating Systems Principles , Retrieved at << http://pages.cs.wisc.edu/~shanlu/paper/sosp061-1lu.pdf >>, pp. 103-116. 2007.

Tan, et al., "/*iComment: Bugs or Bad Comments?*/", Retrieved at << http://www.sosp2007.org/papers/sosp054-tan. pdf >>, pp. 14.

Verbowski et al., "Flight Data Recorder: Monitoring Persistent-state Interactions to Improve Systems Management",7th USENIX Symposium on Operating Systems Design and Implementation, Operating Systems Design and Implementation , vol. 7, 2006, Retrieved at << http://research.microsoft.com/en-us/um/people/chadv/fdr-osdi06-cr.pdf >>, pp. 117-130.

Srinivasan, et al., "Flashback: A Lightweight Extension for Rollback and Deterministic Replay for Software Debugging", Proceedings of the annual conference on USENIX Annual Technical Conference , USENIX Annual Technical Conference , 2004, Retrieved at << http://www.cs.arizona.edu/classes/cs620/fall06/Flashback.pdf >>, pp. 15.

Engler, et al., "RacerX: Effective, Static Detection of Race Conditions and Deadlocks", ACM SIGOPS Operating Systems Review , vol. 37, Issue 5, Dec. 2003, Retrieved at << http://www.stanford.edu/~engler/racerx-sosp03.pdf>>, pp. 16.

Chen, et al., "Pinpoint: Problem Determination in Large, Dynamic Internet Services", Proceedings of the 2002 International Conference on Dependable Systems and Networks DSN , 2002, Retrieved at << http://roc.cs.berkeley.edu/papers/roc-pinpoint-ipds.pdf >>, pp. 10.

Aguilera, et al., "Performance Debugging for Distributed Systems of Black Boxes", Proceedings of the nineteenth ACM symposium on Operating systems principles , ACM Symposium on Operating Systems Principles , 2003, Retrieved at << http://pdos.csail.mit.edu/~athicha/papers/blackboxes:sosp03.pdf >>, pp. 16.

Cohen, et al., "Capturing, Indexing, Clustering, and Retrieving System History", ACM SIGOPS Operating Systems Review , vol. 39, Issue 5, Dec. 2005, Retrieved at << http://www.ifp.illinois.edu/~iracohen/publications/Cohen_etalSOSP2005.pdf >>, pp. 14.

Wang, et al., "Automatic Misconfiguration Troubleshooting with PeerPressure", Proceedings of the 6th conference on Symposium on Opearting Systems Design & Implementation , Operating Systems Design and Implementation , vol. 6, 2004, Retrieved at << http://research.microsoft.com/en-us/um/people/helenw/papers/peerpressureosdi.pdf >>, pp. 13.

Kremenek, et al., "From Uncertainty to Belief: Inferring the Specification Within", Proceedings of the 7th USENIX Symposium on Operating Systems Design and Implementation, Operating Systems Design and Implementation , vol. 7, 2006, Retrieved at << http://www.stanford.edu/~engler/osdi2006-inference.pdf >>, pp. 16.

Friedman, et al., "On the Application of the Bootstrap for Computing Confidence Features of Induced Bayesian Networks", Proceedings Seventh International Workshop on Artificial Intelligence and Statistics, 1999, Retrieved at <<http://robotics.stanford.edu/~nir/Papers/AGW1.pdf >>, pp. 6.

Storey, et al., "Statistical Significance for Genomewide Studies", Aug. 5, 2003, vol. 100, No. 16, Retrieved at << http://www.pnas.org/content/100/16/9440.full.pdf+html >>, pp. 6.

Chang, et al., "Bigtable: A Distributed Storage System for Structured Data", In Proceedings of the 7th Conference on USENIX Symposium on Operating Systems Design and Implementation, vol. 7, Retrieved at << http://labs.google.com/papers/bigtable-osdi06.pdf >>, pp. 1-14. 2006.

Decandia, et al., "Dynamo: Amazon's Highly Available Key-value Store", ACM SIGOPS Operating Systems Review , vol. 41 , Issue 6, Dec. 2007, Retrieved at << http://s3.amazonaws.com/AllThingsDistributed/sosp/amazon-dynamo-sosp2007.pdf >>, pp. 205-220.

* cited by examiner

DIAGNOSIS OF PROBLEM CAUSES USING FACTORIZATION

BACKGROUND

Diagnosis of problems in complex information technology environments or complex information reporting situations can be a challenging task, especially when the reported system problems are sparse but serious in nature. Nearly all computing devices and environments are a combination of layers of devices and sub-devices or a complex network topology of interconnected devices. Such complex data reporting environments abound in the world of computer systems and finding the source of problems in such intricate and interlinked systems can be difficult.

At one level, there is the localized problem of a single computer with hundreds of processes, and each process may have dozens of performance counters associated with the process. In a similar manner, each single computing device is made up of multiple sub-systems or sub-computing devices which may need to be diagnosed for problems. At a higher level, there are a variety of problems in finding the sources of faults in a system involving computer networks or multiple computers.

As in many diagnosis scenarios, each suspected cause of a problem can be very expensive to pursue (e.g., checking individual machines and features). Datacenters and helpdesk operators are not interested in diagnosis methods that have support engineers wasting precious time pursuing endless false leads. Troubleshooting and diagnosis technologies that can more accurately diagnose the source of problems in complex environments can help save time and money because they aid support engineers in addressing problems more quickly.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. While certain disadvantages of prior technologies are noted above, the claimed subject matter is not to be limited to implementations that solve any or all of the noted disadvantages of the prior technologies.

Various embodiments are described for the technology that can include methods for diagnosing problem causes in complex environments by using factorization of a plurality of features. An embodiment of a method can include the operation of identifying a plurality of entities having entity weighting parameters. The entities may be computing devices. The plurality of features can be associated with a respective entity having feature weighting parameters, and an instance of the plurality of features can be associated with individual entity instances. The features can be measurement metrics or feature counters for the entities. A fault label can be applied for an ensemble entity. The plurality of features can be linked using the feature weighting parameter and the entity weighting parameter with a bilinear model as processed by an analysis device. A further operation is estimating weighting values for the entity weighting parameters and the feature weighting parameters for use in a statistical model. The meaningful feature parameters can be found for the statistical model that are likely to be responsible for entity faults. In addition, the entities and features estimated to be responsible for faults associated with the fault label can be reported or shown on a display output.

DETAILED DESCRIPTION

Figure 1:
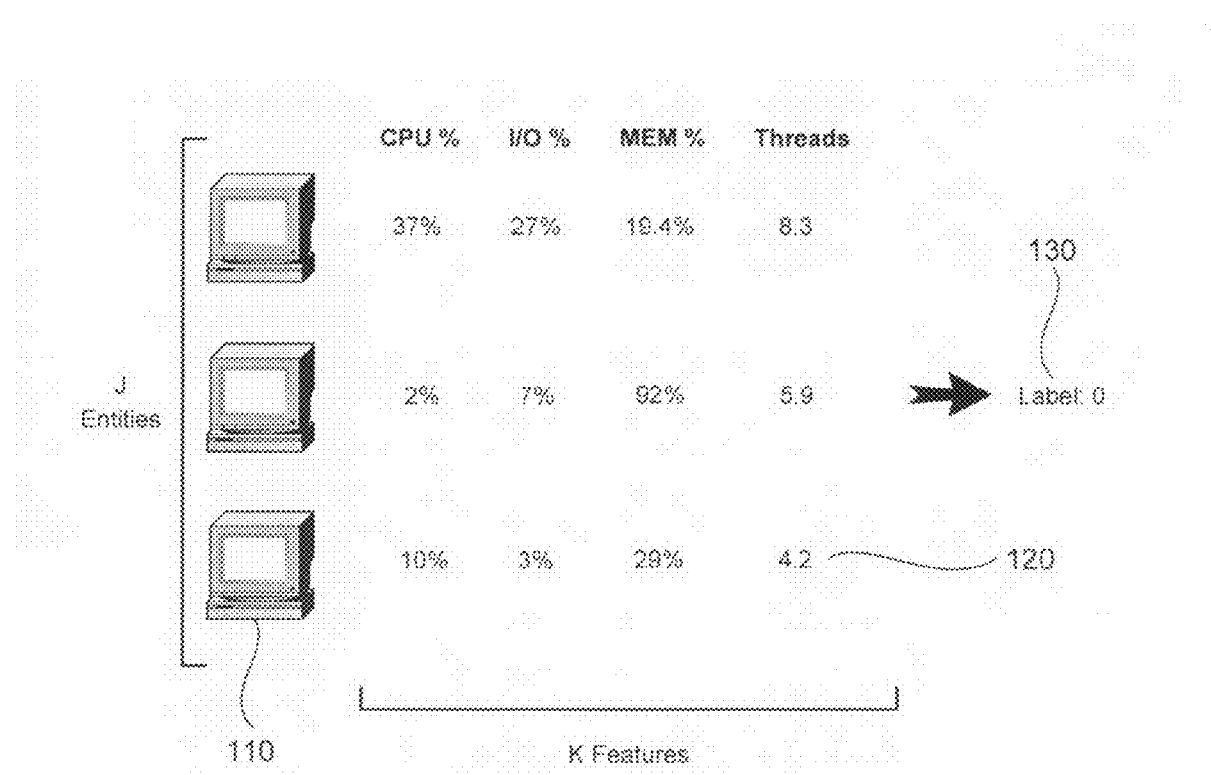
FIG. 1 is a block diagram illustrating an embodiment of a data setup for a single instance of a monitored system.

Reference will now be made to the exemplary embodiments illustrated in the drawings, and specific language will be used herein to describe the same. It will nevertheless be understood that no limitation of the scope of the technology is thereby intended. Alterations and further modifications of the features illustrated herein, and additional applications of the embodiments as illustrated herein, which would occur to one skilled in the relevant art and having possession of this disclosure, are to be considered within the scope of the description.

Diagnosis problems appear in many situations. Determining what disease an individual might have or determining a source of complex data system failures are specific diagnosis scenarios. The structure of the diagnosis problem can come in many forms as well. For instance, in the medical scenario, there are a range of possible causes which all contribute to the same features in a single patient. Such problems abound in the computer systems arena. Not only are there a variety of problems involving multiple computers, there is the more local problem of a single computer with hundreds of processes and scores of hardware devices, each of which may have many performance counters associated with the device or process.

Furthermore, checking individual machines and features for each suspected failure source can be expensive to pursue. As such, a system that minimizes the number of false positives is beneficial because providing accurate results can avoid unnecessary troubleshooting. This desire for error reduction coupled with the small number of available problem labels in many situations makes such diagnosis tasks challenging.

These diagnosis problems can be more effectively addressed using a commonality between many such scenarios due to their factored nature. There are common factors not only in terms of the monitored features but also in terms of the suspected causes. For instance, in a datacenter where certain machines may be failing, the machines are often failing for the same reasons. Such machines may be more prone to failure due to a common manufacturing defect (e.g., insufficient fan speed, improper disk mount, etc.), which is exacerbated when a certain set of features (e.g., CPU load, disk I/O) reach a certain level. Similarly, for the single machine case, there may be several rogue processes, but these processes are likely causing the system to hang in a similar but unknown manner. The common problem may be caused by using too much memory, CPU, or other system problems to which the user's particular machine may be sensitive. Understanding the commonality in the problem provides leverage to solve these problems.

Many systems have J entities that each produce the same set of K features. For example, there could be J computers in a datacenter that each have the same K performance counters for each computer. Instead of having to deal with JK free parameters when analyzing data, entities can be identified that have consistent patterns of features that lead to faults. When the commonality in the problem is understood, a process for recovering which parameters are responsible can be supplied with the present technology. Without the factored structure, a sensible approach would be to apply known logistic regression with JK parameters. In using logistic regression, one parameter might be used for each entity-feature combination with the labels as a target, and high-magnitude values amongst the resulting parameters can then be identified. Of course, given the large number of parameters, a relatively large amount of data may be desirable to avoid overfitting and results with a large numbers of false positives (e.g., 10 times the number of parameters may be considered relatively large, so 10 JK data samples in one case).

In the present technology, logistic regression can be used in a bilinear form with only J+K parameters: one $\alpha$ for each entity and one $\beta$ for each feature type. With many fewer parameters, meaningful parameter values can be found with far fewer false alarms and far less data. To further improve the interpretability of the parameters and reduce symmetries in the solution space, the entity weights $\alpha$ can be constrained to be positive.

Once the parameters have been estimated, the significant parameters can be determined. Testing for the significant parameters can be performed by examining the parameter values over multiple rounds using null distributions (false labels) and sampling true data using the Bootstrap process. The false discovery rate (FDR) analysis helps to ensure an acceptably low rate of false positives. The entirety of the procedure can be called BLR-D for bilinear logistic regression applied to diagnosis.

A pattern of a diagnosis problem which can be addressed is a system in which each of J entities produces the same set of K features or each entity has a common sub-set of K features, yet the system only generates overall faults from the ensemble. The term ensemble means that a single label is applied to report problems for a plurality of underlying computing devices or for a computing device with many underlying processes. Furthermore, the assumption may be made that only certain entities and certain features are leading to the problem. Then the task is to reliably identify which entities and/or features are at fault.

In diagnosis scenarios such as the complex data system, there are J instances of entities (computers), each of which produce a set of the same K features (performance counters). However, faults are only labeled in terms of the entire ensemble (i.e., the datacenter failed to respond) and the faults occur only rarely. In other words, the JK available features for each of many data instances can be factored into J entities with K features each, while the labels are on the ensemble. (i.e., each data instance). The bilinear treatment can represent such scenarios with J+K parameters instead of JK parameters, resulting in more interpretable results and far fewer false positives compared to treating the parameters independently. This improvement is especially true when JK is large with respect to the number of available labels.

FIG. 1 illustrates an example data setup for a single instance of a system being diagnosed, where there are J entities 110, each with K features 120, and a single label 130 (fault or no fault) for the entire ensemble of computers. The technology can also be used with multiple instances of system data or multi-dimensional forms of the data as desired.

Figure 2:
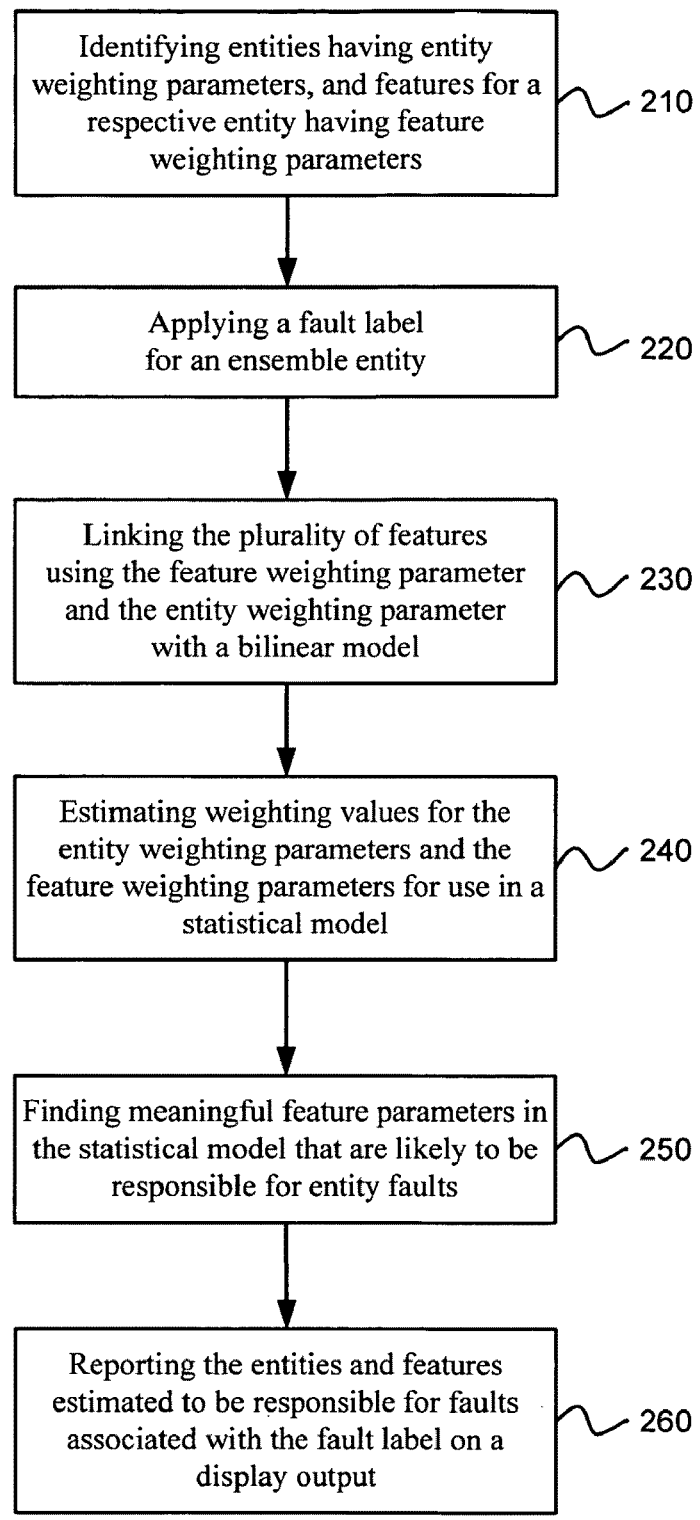
FIG. 2 is a flow chart illustrating an embodiment of a method for diagnosing problem causes in complex environments by using factorization of a plurality of features.

FIG. 2 is a flowchart illustrating a high level description of a method for diagnosing problem causes in complex environments by using factorization with a plurality of features. A plurality of entities can be identified that have entity weighting parameters, as in block 210. Each of the respective entities can have features with feature weighting parameters. In a typical configuration, each entity will have an instance of the features associated with the individual entity. The features can be performance counters for machines and software or other numerical metrics measuring an aspect of the entities' performance. In other words, an entity's features or a sub-group of features can be common to all the other entities.

A fault label can then be applied for an ensemble entity, as in block 220. The fault label can be a label such as a "system failure" or "system unresponsive" label. This label may be applied to an ensemble entity which is an entity that contains one or more systems or subsystems. For example, the label can be applied to a computing device and the sub-systems may be the hardware sub-systems of the computing device or the software processes running the device. Alternatively, the label can be applied to an entire rack of blade servers or a plurality of computing machines on a local area network.

The plurality of features can be linked using the feature weighting parameter and the entity weighting parameter with a bilinear model as processed by an analysis device, as in block 230. The feature weight parameters are defined by a combination of: 1) the entity weight parameter obtained from a respective associated entity, and 2) the feature weight parameter as linked together with other feature weight parameters of the same type for each of the entities being diagnosed. The mathematical and statistical form for doing this will be described later. In addition, the weighting values for the entity weighting parameters and the feature weighting parameters can be estimated for use by a statistical model, as in block 240.

A further operation cart be finding meaningful feature parameters in the statistical model that are likely to be responsible for entity faults, as in block 250. The meaningful feature parameters in the statistical model can be found using resampling of the labeled data. The resampling can be performed using bootstrap resampling with replacement to obtain a distribution over a parameter value and then a determination can be made regarding whether the parameter is meaningful.

The entity weighting parameters and the plurality of features can be stored in a computer memory or computer readable storage medium. In addition, a computer hardware analysis device can be in electronic communication with the entities for analyzing the entities and to compute the desired statistical functions. The entities and features estimated to be responsible for faults associated with the fault label can also be reported, as in block 260. In one embodiment, the entities and features identified as being responsible for the problem can be reported to other systems that are collecting the data. In another embodiment, the responsible entities and features can be displayed on a display output or screen for viewing by a user.

Bilinear Logistic Regression

Additional detail about the bilinear logistic operations will now be disclosed. Since the J entities (each with its associated $\alpha_j$) each produce K features (each with its associated $\beta_k$), there are a total of JK features $f_{ijk}$ for each i of N samples. First, the features are normalized to have unit variance and zero mean. N labels $y_1 \ldots y_N$ are used to explain the model. As in existing logistic regression, a probability models follows:

$$P(y_i) = \frac{1}{1 + e^{-z_i}} = \sigma(z_i)$$

In the bilinear formulation, the weights for each feature contain both an entity specific ($\alpha$) and a feature specific ($\beta$) weight;

$$z_i = \sum_j \sum_k \alpha_j \beta_k f_{ijk} + \delta$$

where $\delta$ is a bias term. In order to constrain the entity parameters $\alpha_j$ to be positive, we parameterize them as the square of a corresponding $\gamma_j$:

$$\alpha_j \gamma_j^2$$

In the past, such a parameterization has frequently been performed via the monotonic $\exp(\gamma_j)$ function. Since there, is a unique mapping between the two parameters, this approach makes it empirically difficult for the $\alpha_j$ to reach zero as it requires $\gamma_j$ to go to $-\infty$. The present approach remedies this problem. Furthermore, while there are now two possible values for $\gamma_j$ for each $\alpha_j$, the $\alpha_j$ will be interpretable due to its uniqueness.

We can express the total likelihood of all the observed data as:

$$P(Y) = \prod_i (\sigma(z_i))^{y_i}(1 - \sigma(z_i))^{1-y_i}$$

and the negative log likelihood (NLL) as $$-\log P(Y) = -\sum_i y_i \log \sigma(z_i) - \sum_i (1 - y_i)\log(1 - \sigma(z_i))$$

The NLL can now be minimized. The gradients with respect to each of the parameters, $\alpha_j$, $\beta_k$, and $\delta$ can be used for the minimization. The gradient with respect to any parameter, e.g., $\gamma_j$, can be written via the chain rule as:

$$\frac{\partial NLL}{\partial \gamma_j} = \sum_i \frac{\partial NLL}{\partial z_i}\frac{\partial z_i}{\partial \alpha_j}\frac{\partial \alpha_j}{\partial \gamma_j} = \sum_i (\sigma(z_i) - y_i)\frac{\partial z_i}{\partial \alpha_j}\frac{\partial \alpha_j}{\partial \gamma_j}$$

Thus, the partials of $(z_i$ are found with respect to the parameters, which are as follows:

$$\frac{\partial z_i}{\partial \alpha_j} = \sum_k \beta_k f_{ijk}$$

$$\frac{\partial \alpha_j}{\partial \gamma_j} = 2\gamma_j$$

$$\frac{\partial z_i}{\partial \beta_k} = \sum_j \alpha_j f_{ijk}$$

$$\frac{\partial z_i}{\partial \delta} = 1$$

Given these partials, the minimization of the NLL is performed with respect to the J+K+1 parameters using the L-BFGS method for quasi-Newton optimization, which can be relatively fast and effective.

Accordingly, the bilinear form is no longer strictly convex even with the positive constraint for the $\alpha_j$, and there are now a continuum of solutions which provide alternate and equivalent NLL values. For instance, all $\alpha$ values might be reduced by half and all the $\beta$ values might be doubled to achieve the same solution. However, this will not adversely affect the gradient descent approach, as moving along such a continuum would always result in a zero gradient, and if the smallest possible gradient were zero the L-BFGS process would terminate. Thus, a solution is expected to land at some point along the optimal continuum. In order to achieve consistency between trials, the final a parameters can be normalized by the sum of their values.

Testing Parameters for Significance

Once the parameters have been optimized, the question of whether a particular $\alpha_j$ or $\beta_k$ is significant can be evaluated. Because this technology can operate in regimes of small amounts of data with respect to the number of features, there can be some degree of overfitting. As a result, a simple threshold would be a poor option. Accordingly, a statistical test can be used to distinguish meaningful parameters from noise. For this purpose, Efron's Bootstrap may be used, in which the data can be resampled with replacement.

Figure 3:
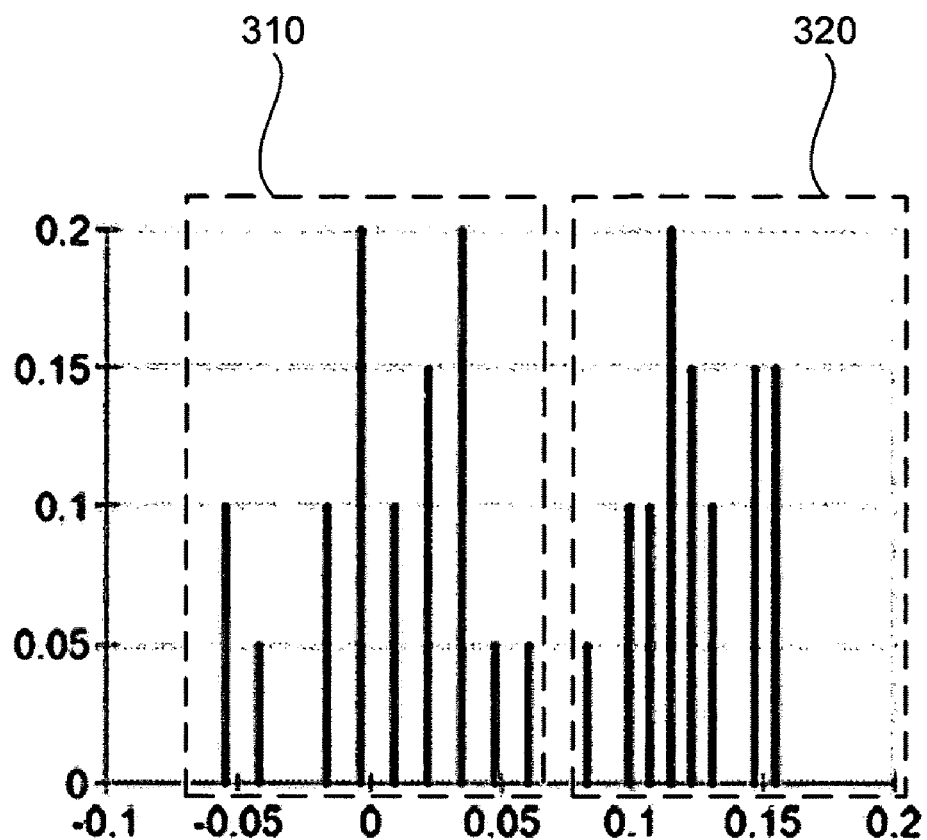
FIG. 3 is a chart illustrating an example of histograms for two populations used for comparison purposes and to determine which factors are significant.

In this case, the process produces not a binary answer but a continuous parameter, and so comparing the answer to zero is not inherently meaningful. Instead, a first population is drawn from the distribution over each estimated parameter value with the true labels using the Bootstrap process. In addition, a second population is drawn from the distribution over the values with sets of random labels (i.e., null distributions). The two populations can then be compared to evaluate the probability they are coming from different distributions. If the parameter value from the true labels has a higher mean (in absolute value) and the populations are different with sufficient statistical significance, the candidate parameter can be defined as being among the causes of the observed faults. In FIG. 3, the histograms of the two populations are provided for a parameter that is known to be significant. The histograms of a parameter value corresponding to a known cause can be displayed with the parameter's value resulting from the false labels 310 and the parameter's value resulting from the true labels 320.

Whether the two populations will have normal distributions or even the same variances is not known in advance, and so the use of the standard Student's t-test is not effective. Instead, the non-parametric Mann-Whitney U-test can be applied, which makes no assumptions about the underlying distributions. FIG. 3 above demonstrates how different and non-Gaussian these distributions can be, and the figure shows histograms of the two populations for a parameter (both false and true labels) corresponding to a true problem cause.

Such statistical tests come at a substantial computational cost by making multiple estimates of the parameters under true and false labels. While a threshold could be applied to a single round and achieve a result, the advantages of the statistical method provide a substantial advantage both in terms of detecting causes and in reducing false alarms.

Computing the False Discovery Rate

In order to measure the performance of the technology when the causes are not known a priori, the false discovery rate (FDR) can be estimated. Such estimations have the challenge of reporting significance on a large number of parameters as well as addressing the concerns of the personnel expense involved in investigating a large number of false alarms. Accordingly, the FDR(a) can be found for process α, where α reports whether the parameters are significant. This FDR quantity is the average number of parameters falsely reported as significant under null distributions $D^q$ (i.e., sets of false labels on distribution D) divided by the average number of parameters reported with true labels. The denominator is commonly approximated by a single value on the dataset of interest, N(D, a), which is the number of parameters N reported by α as being significant for process α. The distributions $D^q$ are then created by assigning random labels to the data. Thus:

$$FDR(a) = E\left[\frac{F(a)}{S(a)}\right] \cong \frac{E[F(a)]}{E[S(a)]} \cong \frac{\sum_{q=1}^{Q} \frac{N(D^q, a)}{Q}}{N(D, a)}$$

The resulting quantity tells what fraction of the parameters reported as significant are expected to be false alarms. Ideally this quantity will be, as close to zero as possible. In practice, a user of FDR may tune the parameters of the method (e.g., the U level of the significance test) in the hopes of achieving a minimal FDR while still producing a non-empty set of results for the true labels, i.e., N(D,a)>0. If a low FDR is not achievable, then the technology may not be able to produce reliable results for the given dataset.

Figure 4:
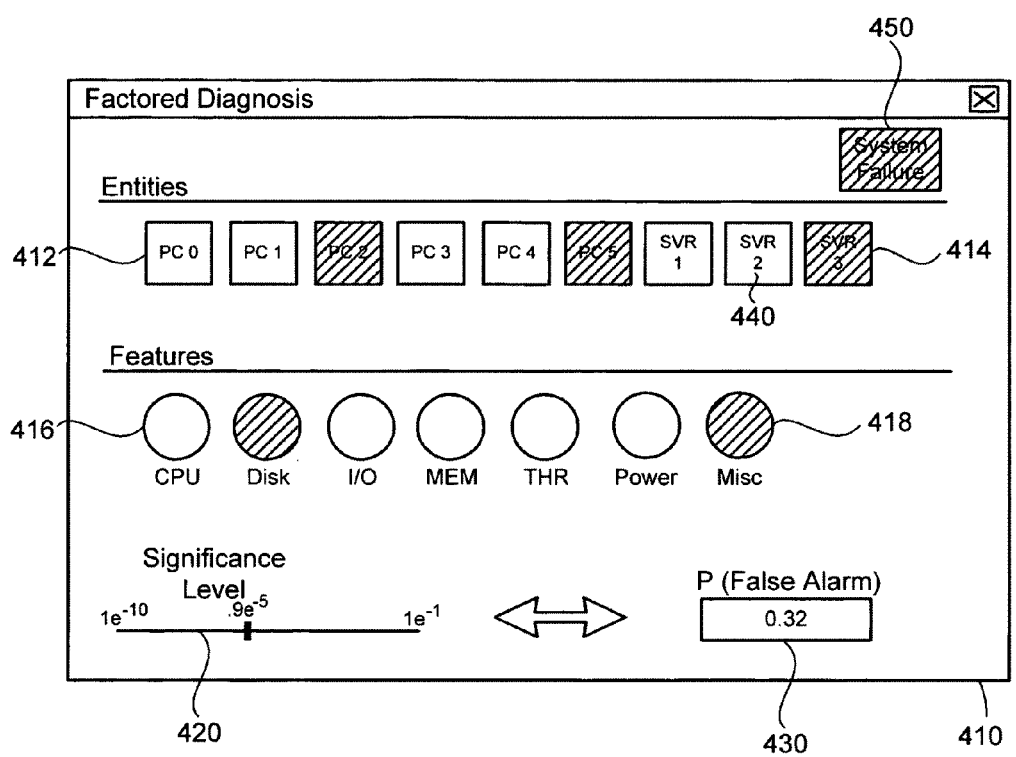
FIG. 4 illustrates an example user interface for displaying the results of factored diagnosis analysis.

FIG. 4 illustrates an example user interface 410 for displaying the results of factored diagnosis. Such an interface can indicate which entities 412 and features 416 are a potential source of the problem. The entities believed to be causing problems 414 can be identified by highlighting, applying a color, or using another notification method. In a similar manner, the features 418 believed to be causing problems can be identified by highlighting, applying a color or using another notification method.

The user can adjust the significance level of the statistical tests 420 and thereby adjust the set of identified entities. Adjusting the significance level also affects the probability of false alarms 430. This display output enables a display of the entities and features responsible for faults associated with the fault label. For example, each entity may have its own fault label which can be the entities name 440 (e.g., svr2) and a "failed" or "not failed" value which is reflected graphically. In another embodiment, a fault label can be displayed for the entire ensemble or group of network of devices 450.

Figure 5:
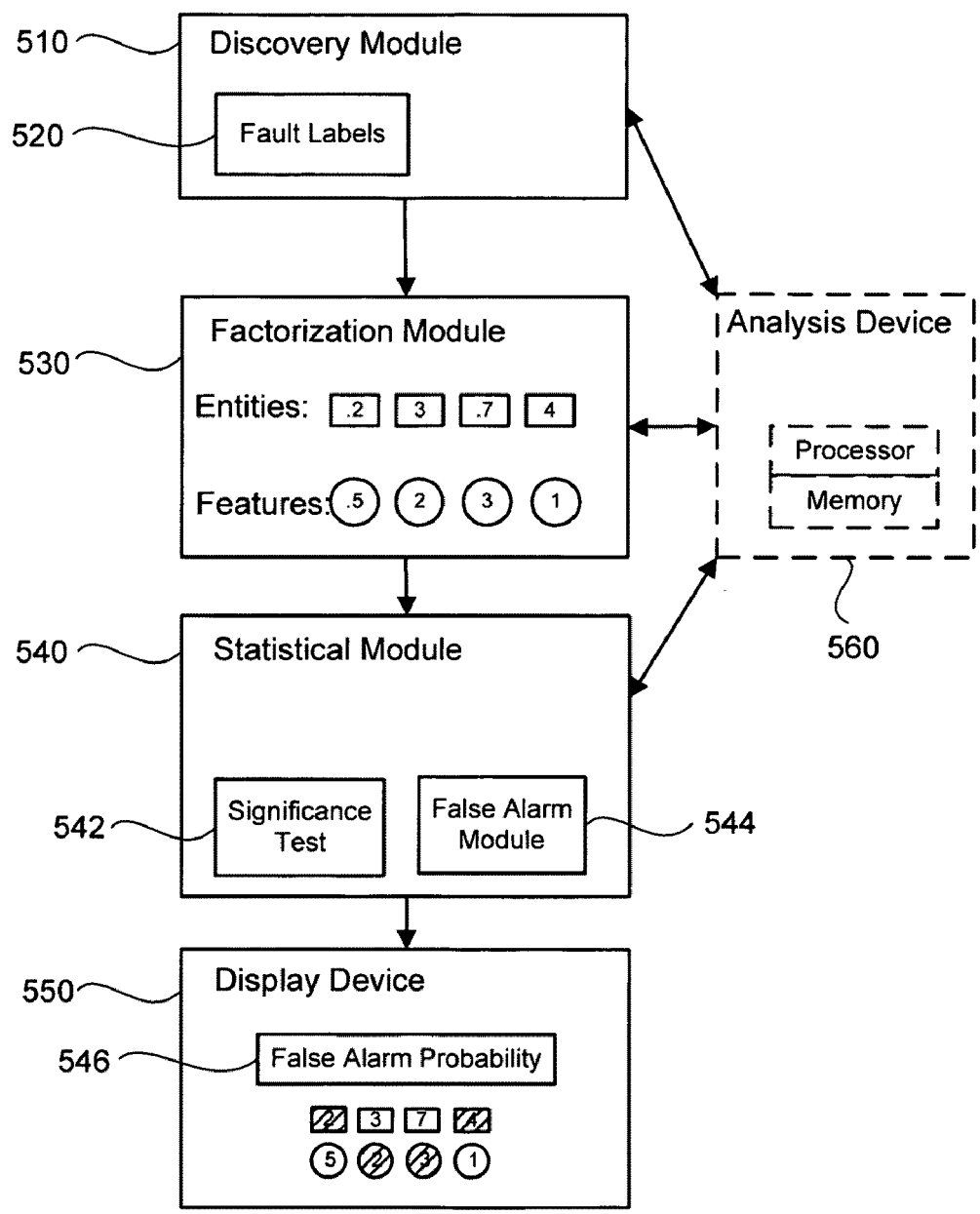
FIG. 5 is a block diagram illustrating an embodiment of a system for diagnosing problem causes in computing networks by using factorization of a plurality of performance features.

FIG. 5 illustrates a system for diagnosing problem causes in computing networks by using factorization of a plurality of performance features. The system can include a discovery module 510 configured to identify computing devices and associated device weighting parameters. In addition, the plurality of performance indication features associated with a respective computing device can have performance feature weighting parameters. The information or counters obtained for the performance indication features can be collected by the discovery module. Each computing device has an instance of the plurality of performance indication features. One or more fault labels 520 can be provided for an ensemble grouping of one or more computing devices.

A factorization module 530 can be configured to link the plurality of performance indication features using the feature weighting parameters and the device weighting parameters by applying a bilinear model. A statistical module 540 can be configured to estimate weighting values for the device weighting parameters and the feature weighting parameters for use in a statistical model. In addition, the statistical module can find meaningful feature parameters in the statistical model that have a probability of being responsible for device faults.

The statistical module can also contain the modules or processes to compute the significance test 542 and have a false alarm module 544 to compute the false alarm probability. Alternatively, these modules may be separate from the statistical model. The processing for the discovery module, factorization module, and statistical module can be performed in an analysis device 560 that has processor and a memory. Alternatively, the analysis computing hardware can be included in each separate module.

A display device 550 can display the computing devices and performance features estimated to be responsible for faults associated with the fault label. The false alarm probability 546 and significance values can also be displayed. In short, FIG. 5 illustrates the process of taking the learned model parameters and applying appropriate statistical analyses to produce identified causes as well as the probability of false alarm (i.e., the probability of falsely reporting something as a problem cause).

Factoring the model, as described, implies that some number of entities have a shared set of features changing in the same way when a fault is reported. If a number of entities are actually causing problems and each entity is failing due to a significantly different configuration of features, this approach will be less effective because the modeling assumption used by the factorization is not likely to be met. A further aspect of any such analysis is performing statistical tests to determine which parameters are most likely to be responsible for the faults, as well as estimating the likelihood of false alarms (i.e., entities/features reported to be responsible that are not in fact true causes). The former results in the identification of the faults, and the later informs the user whether the user can trust the results of the identification. This analysis technology is effective in a posteriori analysis where once the labels and data are all obtained, the system identifies potential problem causes.

Example Applications

To illustrate this technology, two sets of examples will now be provided. The first set of examples is performed on synthetic data generated by a model of a datacenter, which can measure true detection rates and false positives. The second example is from actual data on process behavior on a personal computer.

Datacenters have recently received enormous attention in the software industry for their ability to deliver compelling services. Inside the datacenters, these services run on large sets of machines with homogeneous software, though the machines do not always have homogeneous roles. A few machines may provide some form of coordination function for other machines in the pool where the storage services execute the same piece of software across a large number of machines. On each of the J machines, the homogeneous software will typically manifest K features measuring such aspects as CPU utilization, network utilization and bandwidth, and disk utilization. To an external observer, the success or failure of one of these systems to meet a Service Level Agreement (SLA) will manifest itself as a label on the entire ensemble.

A synthetic model was developed that captures the characteristics of such datacenter systems. In the baseline system, there are 30 machines with 30 features each. This means there are 900 features for each time step. For each feature, zero-mean normally distributed values are generated. The variance for each feature is separately drawn from a uniform distribution for each dataset as a baseline. Five machines can be selected as a baseline to be "prone to faults" and five features can be selected to be "fault causing." The features for all machines for each time step can then be generated. If any of the "fault-prone" machines in the ensemble has a "fault-inducing" feature that is greater than two standard deviations from zero, then with probability $P_{fault}$ (0.8 in the baseline) an SLA violation is generated for the datacenter as a whole. The baseline dataset contains 1000 labeled samples of data with balanced numbers of positive and negative examples. In other examples, the different parameter values (number of machines, etc.) are varied over a range of values. For each unique value set, 10 synthetic trials can be produced with a baseline of 1000, samples each. All values displayed in the figures below are averaged over the ten corresponding trials to smooth the effects of individual variations.

Figure 6:
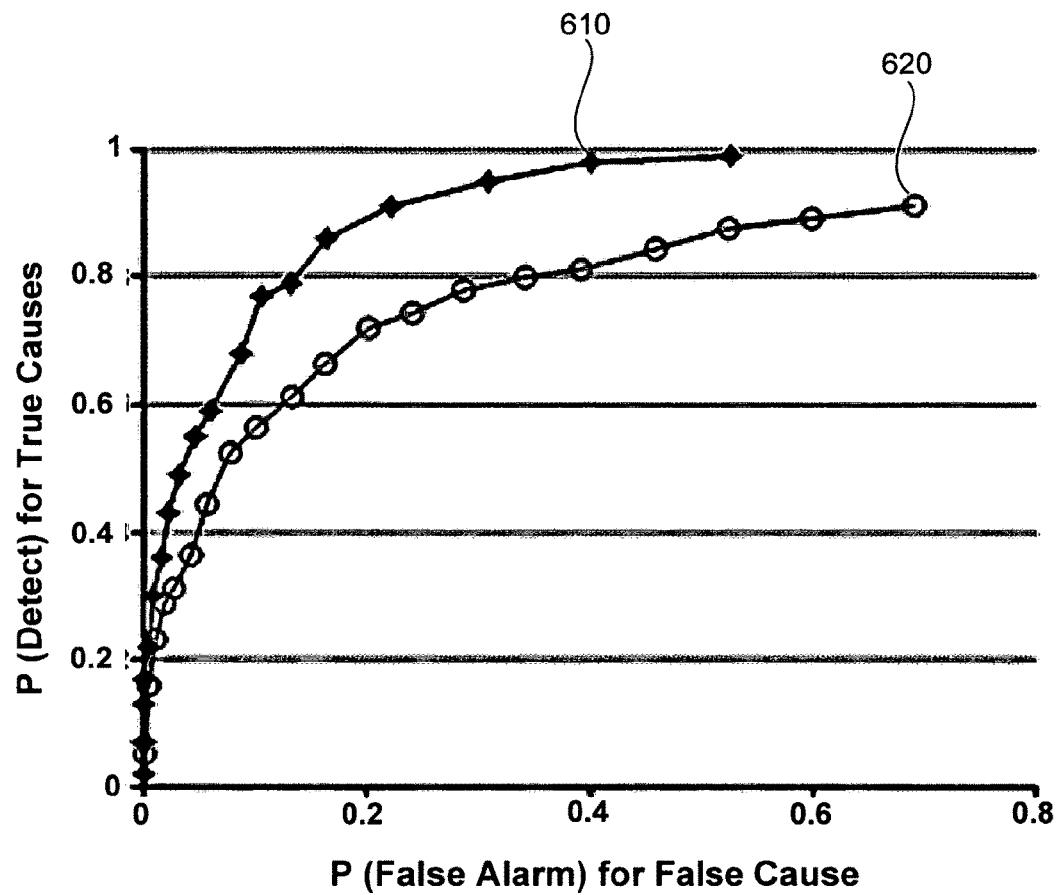
FIG. 6 illustrates an example ROC (Receiver Operating Characteristic) curve with the probability of correctly identifying a problem entity or feature plotted against the probability of falsely identifying an innocent entity or feature as a cause.

Before examining the performance under these varying parameters, the performance under the baseline parameter settings will be investigated. Because these concern a fixed set of parameters, a ROC (Receiver Operating Characteristic) curve can be generated for the present technology by varying the level of significance U used to determine whether a given entity or feature is a cause. FIG. 6 shows a ROC curve for the present technology 610, with the probability of correctly identifying a guilty entity or feature plotted against the probability of falsely identifying an innocent entity or feature as a cause. In addition, a curve is shown for a standard method 620 for identifying sparse causes in feature-rich data (i.e., ordinary logistic regression with L1 regularization). As with BLR-D, the data is pre-normalized and includes a bias term δ. In order to give logistic regression a fair chance, the same statistical tests for significance are applied to the logistic regression learned parameters. This proved to be far more effective than the existing method of applying Wald's tests to a single fit of the parameters (i.e., as opposed to multiple trials using the Bootstrap and null distributions). The use of logistic regression along with these statistical tests can be called LR-D.

While FIG. 6 shows that the present technology has a clear advantage over logistic regression, there are other advantages too. Since each problem cause reported by the technology is something a technician may have to investigate which takes time and money, then accurate reporting is an important criteria. In this baseline example, there are five fault-prone machines and five fault-inducing features. This corresponds to ten parameters in the BLR model but twenty-five for the LR model, as the latter treats each entity-feature combination separately. The BLR model has only J+K total parameters (60 in this case, with 50 false) to contend with, whereas the LR model has JK (900, with 875 false). Thus, even having the same rate of false alarms would make things substantially worse for the analyst using LR.

Figure 7:
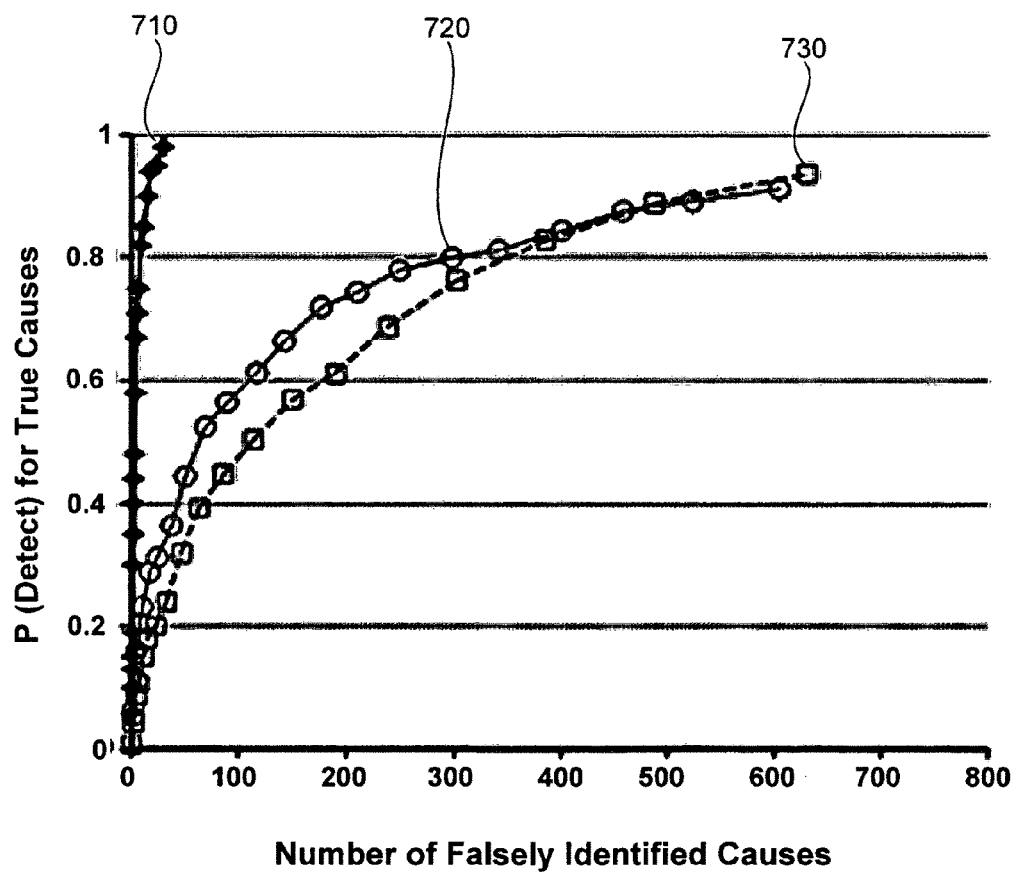
FIG. 7 illustrates an example ROC curve redrawn against the number of falsely identified causes.

To better reflect the true cost of investigation, in the remainder of the FIGS., the number of falsely identified causes is shown instead of the probability of falsely identifying a cause. In FIG. 7, for instance, the ROC curve is redrawn against the number of falsely identified causes. The advantage of this technology becomes far more dramatic here. At a precision of 0.7, for example, the BLR-D method 710 instructs a technician to investigate five falsely identified machines or features, while LR-D 720 instructs the technician to investigate around two hundred machine-feature combinations. Similar results are for LR-D with L1 regression (marked by the o marker) 720, and LR-D with L2 regression (marked by the square marker) 730.

A discussion of the regularization methods used for the ordinary logistic regression will now be provided. The regularization is achieved by adding a norm of the parameter vector to the NLL multiplied by a constant weight. Such a formulation prefers parameter settings with smaller norms. The L2 norm is well known and simpler to implement. However, the L1 norm is more effective at achieving sparse solutions. Fine tuning can be used to choose the appropriate constant to achieve sufficiently sparse solutions, while overly aggressive values of the constant can result in poorly performing solutions. This weight under the baseline conditions can be adjusted to produce high detection rates with good sparsity. The L1 performance relative to L2 regularization in FIG. 7 is also shown. L1 regularization may be used for all of the examples using LR-D due to the better performance of L1 regularization. In the examples, regularization was not applied to the parameters learned by the BLR method. As such, the step of finding an appropriate regularization weight was avoided.

Examples over Varying Parameter Values

In each of the four examples below, one of the parameters was varied from the baseline. Specifically, the parameters that can be varied were: the number of machines in the datacenter, the number of fault-prone machines, the number of time steps/labels, and $P_{fault}$, which is the probability of a fault-inducing feature generating a failure under fault conditions. For each parameter value, ten sets of data were generated. For each dataset, the distribution of each parameter was computed (for both BLR-D and the logistic regression variant LR-D with L1 regularization) under false and true labels values as described previously over 20 sample rounds each with a Bootstrap fraction of 0.8. Then the Mann-Whitney test was used to determine if the parameters were significantly different under these conditions at a U value of 0.01 (for BLR-D) and 0.001 (LR-D). As one can see from FIG. 6, there are many points which can be chosen from the ROC curve for each setting. The particular values selected tended to give commensurate detection performance for both methods but provide greatly differing numbers of false alarms.

In the examples, the true J fault-prone machines and K fault-causing features result in j+k significant features for BLR-D to detect, whereas for LR-D there are JK significant features. The detection rates are in terms of these total numbers. The number of false positives (i.e., the number of parameters incorrectly identified as significant) are shown to illustrate the true cost to the analyst of investigating these false leads. Each displayed point is averaged over the ten generated datasets with the given parameters. There are thus 400 rounds of BLR-D and LR-D for each parameter setting: 20 sample rounds of bootstrap plus 20 sample rounds of null distributions multiplied by the ten generated datasets.

Figure 8:
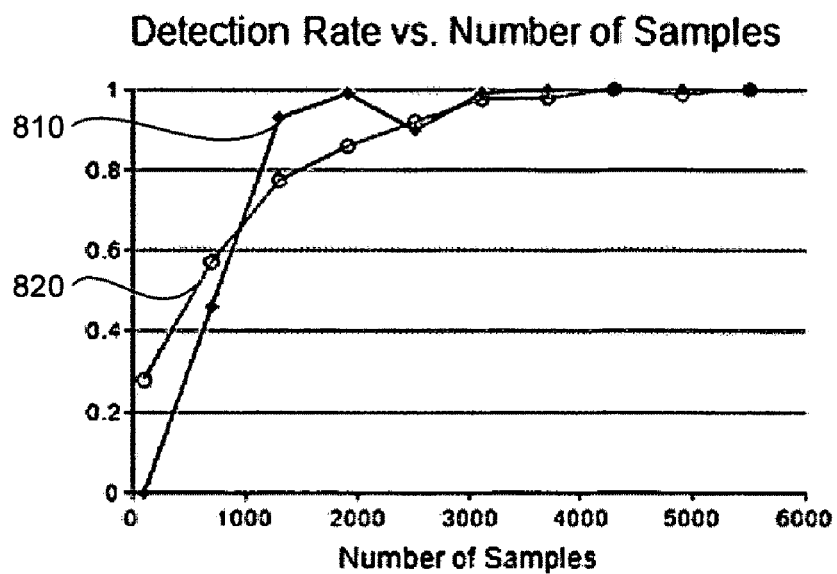
FIG. 8 illustrates a chart of a detection rate for the true causes of datacenter faults versus a varying number of labeled samples in an example application.
Figure 9:
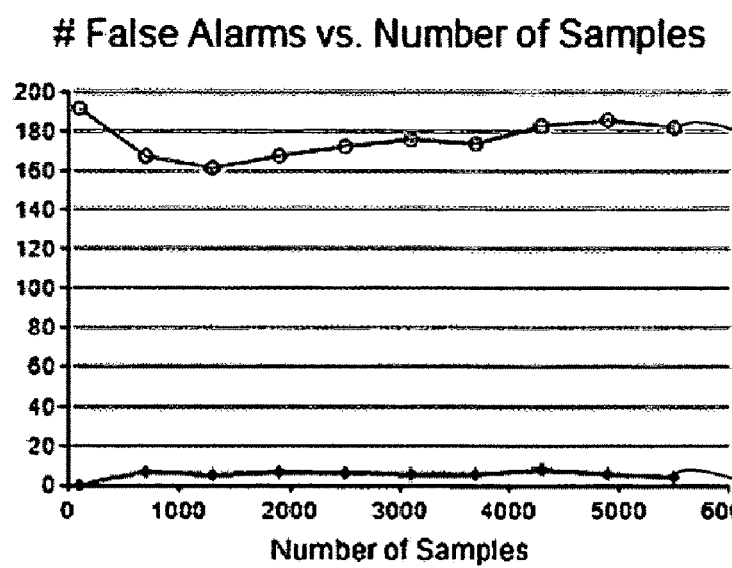
FIG. 9 illustrates a chart of the number of machines and features falsely reported as causes of datacenter faults versus a varying number of labeled samples in an example application.

The first example involved varying the number of samples for the dataset. The results are shown in FIGS. 8 and 9. In this case, these samples were taken from a larger set of generated samples so a balanced number of positive and negative examples are provided. Note that later examples using varying $P_{fault}$ and examples with real data show the performance of the present technology under unbalanced data. FIG. 8 illustrates a detection rate for the true causes of datacenter faults versus a varying number of labeled samples for our method. The BLR-D line 810 is marked with a +, and the LR-D line 820 is marked with an o. FIG. 9 illustrates the number of machines and features falsely reported as causes of datacenter faults versus a varying number of labeled samples for the present method. The BLR-D line 920 is marked with a +, and the LR-D line 910 is marked with an o.

Increasing the number of samples results in a higher probability of detecting the true culprits for both methods. However, the present technology achieves similar levels of detection with far fewer numbers of false alarms. There are other points on the ROC curve which give higher levels of detection while still incurring substantially fewer false alarms than LR-D. However, an analyst would likely prefer the lower number of false positives, as each investigation takes additional time and expense.

Figure 10:
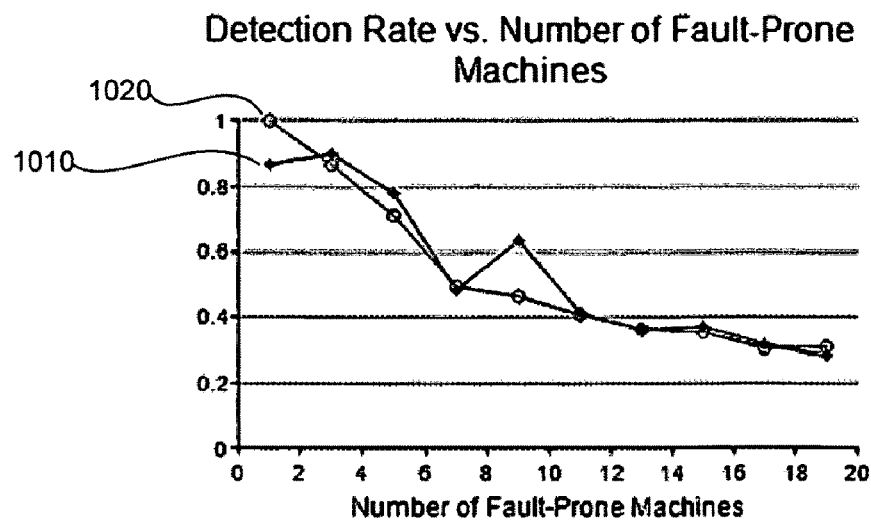
FIG. 10 illustrates a chart of the detection rate for the true causes of datacenter faults versus varying number of fault-prone machines in an example application.
Figure 11:
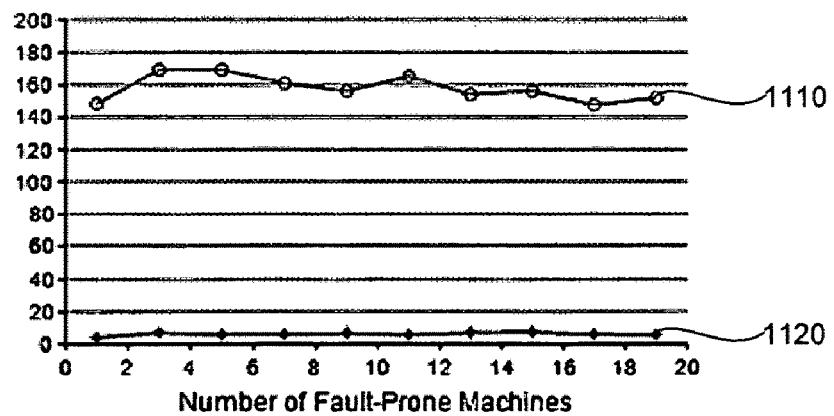
FIG. 11 illustrates a chart of the number of machines and features falsely reported as causes of datacenter faults versus a varying number of fault-prone machines in an example application.

The second example involves varying the number of fault-inducing features resulting in failures. This example involves changing how many of the 30 machines in the baseline datacenter were prone to having faults while maintaining a fixed number of (balanced) samples. This problem becomes more difficult as more machines become fault-prone, as there are more possible (true) causes that each fault can be attributed to, and thus fewer faults may be seen for each individual cause. FIG. 10 illustrates the detection rate for the true causes of datacenter faults versus a varying number of fault-prone machines. The BLR-D line 1010 is depicted with + signs, and LR-D line 1020 is depicted with o signs. FIG. 11 illustrates the number of machines and features falsely reported as causes of datacenter faults versus a varying number of fault-prone machines for BLR-D line 1210 (+) and LR-D 1220 line (o). There is a decline in detection performance as the number of fault-prone machines increases, but again the present technology has a much smaller number of falsely identified causes.

Figure 12:
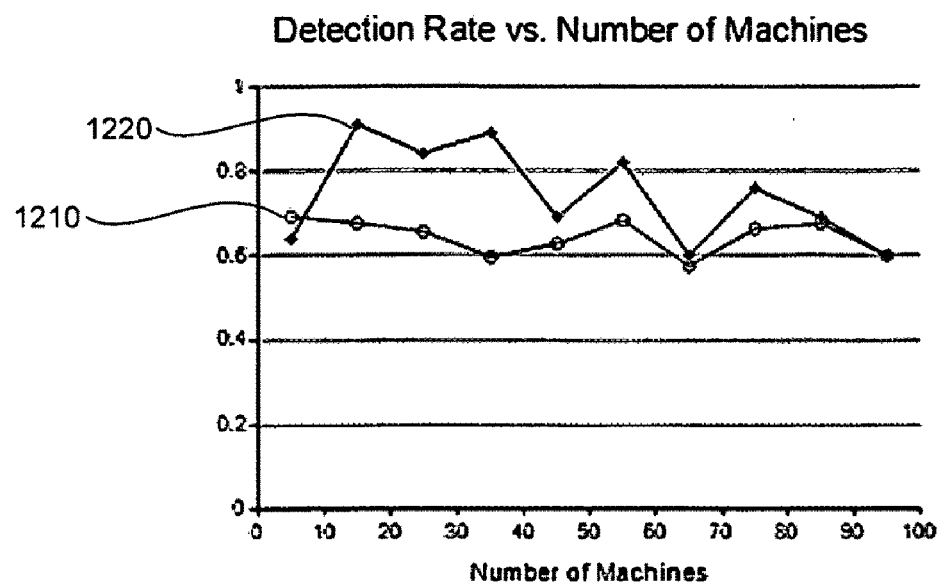
FIG. 12 illustrates a chart of a detection rate for the true causes of datacenter faults versus a varying number of machines in the datacenter an example application.
Figure 13:
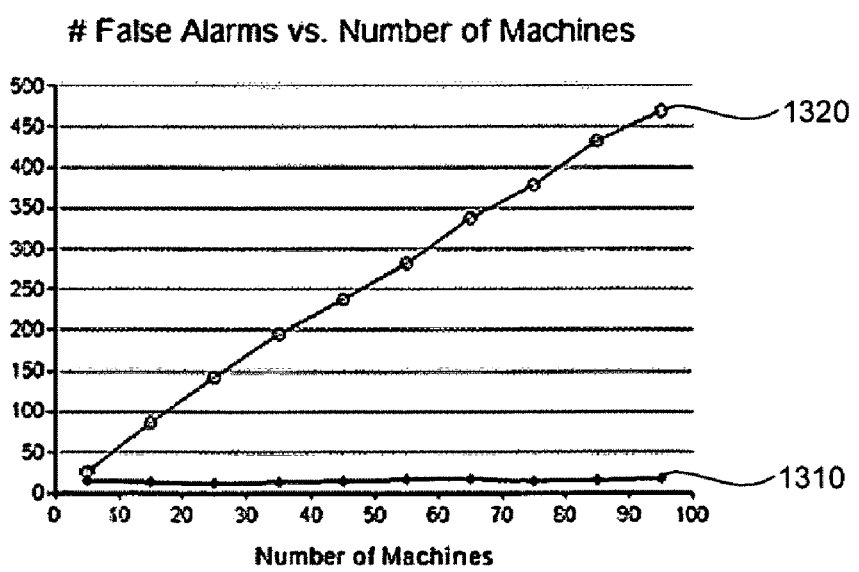
FIG. 13 illustrates a chart of a number of machines and features falsely reported as causes versus a varying number of machines in the datacenter in an example application.

In a third example, the number of machines in the datacenter is varied. In this example, the number of machines in the datacenter is increased while keeping the number of (balanced) labeled samples constant. The becomes increasingly difficult as there are more opportunities to overfit to the data. For 95 machines, the data matrix is 1000 samples by 2850 features. As the number of machines increases, the number of parameters for the present technology increases as J+K and as JK for LR-D. As a result, with 95 machines in the datacenter, the present technology had 125 possible causes to contend with, while LR-D had all 2850 to sort out. This resulted in a linear increase in false alarms for LR-D with the number of machines. FIG. 12 illustrates a detection rate for the true causes of datacenter faults versus a varying number of machines in the datacenter for our method, BLR-D 1120 (+), and LR-D 1110 (o). For this example, a higher point was chosen in the ROC curve for BLR-D (U=0.1) to show that a higher accuracy can be achieved than LR-D while still producing many fewer false alarms. At a setting of U=0.01 for BLR-D on this example, the detection rate falls by about 10 on average, but the average number of false alarms drops by 66, from 15 to 5. FIG. 13 illustrates a number of machines and features falsely reported as causes versus a varying number of machines in the datacenter, BLR-D 1310 (+), and LR-D 1320 (o).

Figure 14:
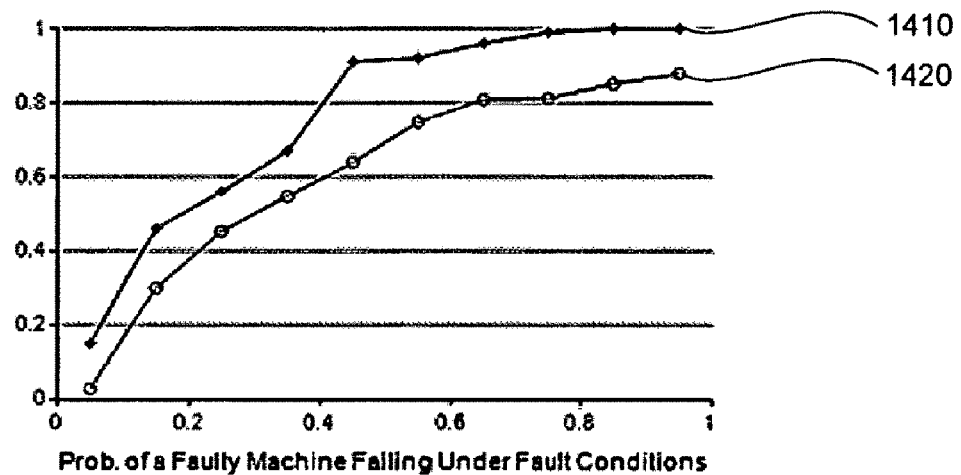
FIG. 14 illustrates a chart of a detection rate of the true causes of datacenter faults versus a varying $P_{fault}$, which is the probability of a fault-inducing feature generating a failure under fault conditions, in an example application.
Figure 15:
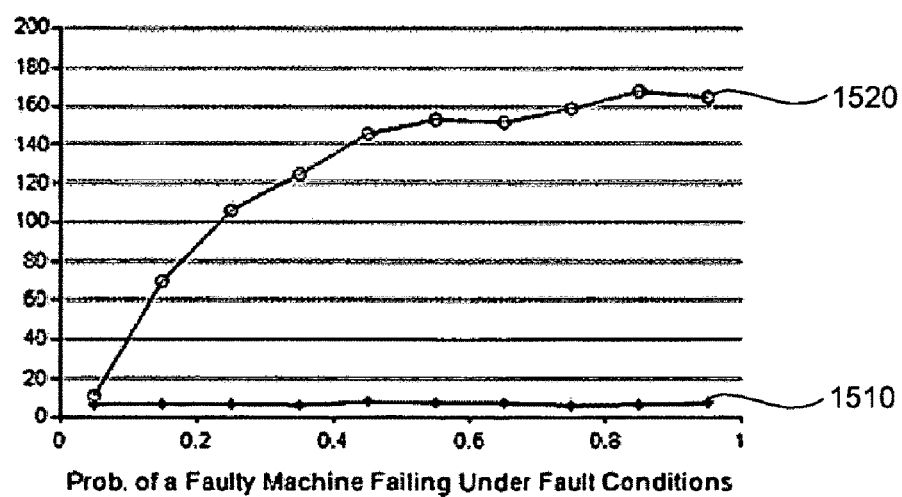
FIG. 15 illustrates a chart of the number of machines and features falsely reported as causes versus $P_{fault}$ in an example application.

In a fourth data center example, the probability of faulty machines resulting in a failure under fault conditions is varied. This example shows what happened when the probability $P_{fault}$ that a machine will fail given that a fault-inducing feature reaches fault conditions was changed (i.e., it exceeds two standard deviations from its mean). Furthermore, the labels on this data were not balanced, and the number of samples is fixed at 2000. Low values of $P_{fault}$ can make this analysis difficult, as low fault values mean that faults occur relatively rarely. Even when fault-inducing conditions occurred, a fault was unlikely to appear. FIG. 14 illustrates a detection rate for the true causes of datacenter faults versus a varying $P_{fault}$ for the present method, and shows a BLR-D line 1410 (+), and a LR-D line 1420 (o) (unbalanced data). FIG. 15 illustrates the number of machines and features falsely reported as causes versus $P_{fault}$, and BLR-D line 1510 (+), and LR-D line 1520 (o) (unbalanced data). Even under this highly unbalanced label scenario, the present technology showed both good cause identification capabilities and a small number of false alarms.

A second type of example scenario is based on processes in a machine. The example scenario is based on the large number of interacting processes on a typical machine in a consumer setting. In an operating system, each of these processes may have a large number of performance counters that can be treated as features. These features are similar to the per-machine features in the datacenter examples but they instead reflect the contribution of a given process to machine-wide metrics such as CPU utilization.

When a machine becomes unresponsive in a consumer setting, the user perceives this as a label on the entire system. To measure the utility of the BLR-D technique in a real-world setting, two months of performance counters were gathered from a plurality of processes on a machine. This machine was in active use by a user during the period. Based on well-known causes of unresponsiveness problems (such as swapping), a process called "WhySlowFrustrator" was introduced that intermittently and intentionally caused such unresponsiveness by increasing CPU, memory, and IO loads. The user generated a label by pressing a hotkey whenever the machine became unresponsive, which brought up a labeling UI (the "WhySlow" process). This dataset is difficult to analyze for problems because the labels from the user are few and far between. Over the two month period, there were only 63 positive labels, yet mere were 104 active processes, each with 28 features, for a total of 2,912 features per time step. To add to the difficulty, in many of the cases of the frustration process being activated, the user did not end up pressing the key (the user wasn't there, didn't notice, etc.). This is analogous to a low $P_{fault}$ in the datacenter example. Furthermore, there were cases where the user labeled an event but the WhySlowFrustrator was not active (i.e., the user was frustrated by some other process).

Figure 16:
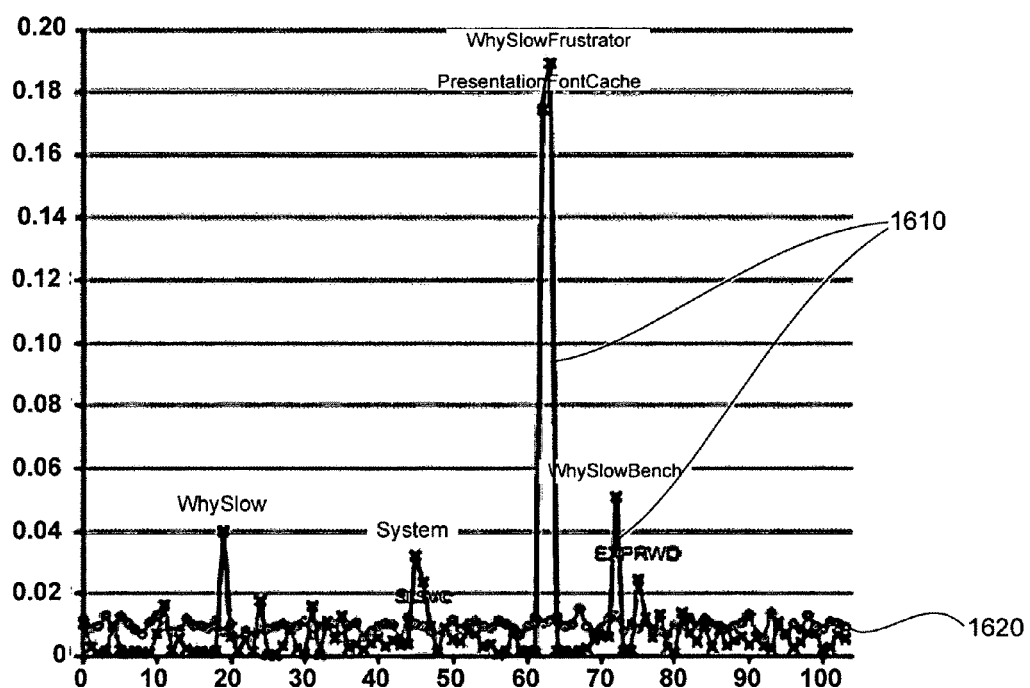
FIG. 16 illustrates a chart of learned entity weights for processes on a machine under true labels and false labels in an example embodiment.
Figure 17:
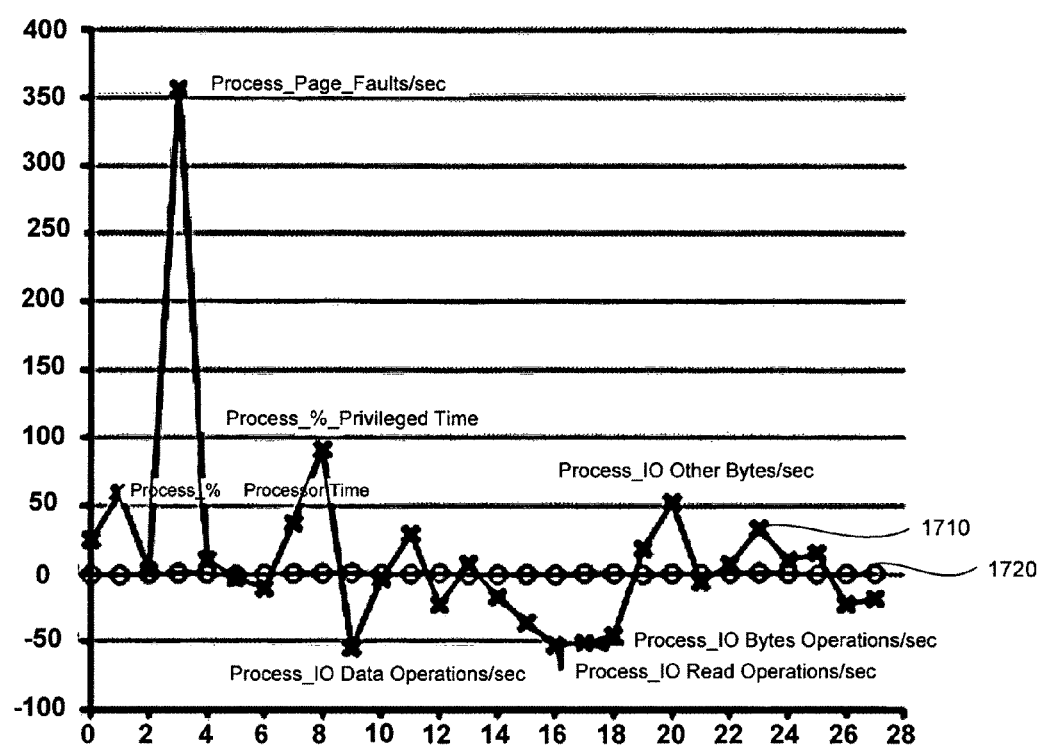
FIG. 17 illustrates a chart of learned feature weights for process features under true labels and false labels in an example embodiment.

Because of the large number of features, the use of balanced data was infeasible due to the 132 parameters in the BLR-D model. A minimum of 1,300 samples was desirable and ideally many more. Thus 100 negative examples per positive example were sampled, resulting in 6,363 labeled samples (63 positive). The BLR-D process was then applied over 20 rounds (with a bootstrap fraction of 0.99 given the sparsity of positive labels) for the true labels as well as the false labels. Computing the FDR was done using the same procedure, now for multiple rounds of $D^Q$, i.e., data with false labels. The threshold on the U value from the Mann-Whitney test was then adjusted until the smallest possible FDR was achieved while maintaining a non-empty set of identified causes for the true labels. This reduced the FDR to zero with a U value of 0.02 while still identifying three entities as causes under the true labels. FIG. 16 illustrates learned entity weights for processes on a machine under true labels 1610 (x) and false labels 1620 (o). FIG. 17 illustrates learned feature weights for process features under true labels 1710 (x) and false labels 1720 (o).

The estimated entity weights are shown in FIG. 16 and the feature weights in FIG. 17. Of the entities, "WhySlowFrustrator," "PresentationFontCache," and "WhySlow" were identified as causes at U=0.02, as well as nine features, all related to memory, CPU, and I/O utilization. WhySlowFrustrator is a known true cause, and the selected features correspond well to its modes of behavior. WhySlow is a classic case of correlation versus causation. When the user felt a frustration, the user would press the designated hotkey, which would activate the WhySlow reporting GUI. PresentationFontCache, on the other hand, was unexpected. This is an operating system process which often takes up a significant amount of memory. The large amount of swapping caused by WhySlowFrustrator may have resulted in this process being consistently swapped out. It is also possible that the PresentationFontCache process was an independent source of frustration. This example shows that the present technology can identify true causes of problems in real-world scenarios with low numbers of false alarms.

To reiterate and summarize to some degree, a factored model can be a good fit for complex computing systems at a network levels an individual computing device level, or other complex forms. The technology can use a bilinear form of logistic regression paired with testing to compute the significance of individual parameters and use the FDR to find appropriate thresholds of significance. This process proved to be an effective means of diagnosing causes with very low rates of false positives.

There are a number of diagnosis problems which can be addressed using this technology and factored form. The factored form uses J entities with K features each, and N (labeled) instances of the resulting JK features, where the number of instances is at least on the order of J+K, but smaller than J*K.

Examples of areas where the present technology can be used include but are not limited to: finding the cause of faults in a data center, finding troublesome processes on a single computing device, medical diagnosis, troubleshooting manufacturing defects, finding malware causes, finding faulty network routers, or other sparse data situations. In addition, the present technology can be used for identifying problematic traffic intersections, identifying weak points in the power grid, identifying dangerous drug combinations (e.g., J drugs with K features (dosage taken, length of use, etc.)), and identifying effective ads and properties (about placement, type, appearance, etc.) from each of many different web pages. In another application the technology may identify dishonest cashiers with J cashiers with K features (hours worked that day, average income per week, etc.), using data from many days with labels on whether the cash register ended up short. In another example, a retail chain with J stores, each with K features (store layout, products sold, hours, etc.), will have some weeks where sales are unusually low. This technology may be used to identify the stores and features that are leading to the low sales. This is only a small set of examples and many other applications of the technique exist.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Furthermore, the described features, structures, or characteristics may be combined in any suitable manner in one or more embodiments. In the preceding description, numerous specific details were provided, such as examples of various configurations to provide a thorough understanding of embodiments of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method for diagnosing problem causes in complex environments using factorization of a plurality of features, comprising:
    identifying a plurality of entities having entity weighting parameters, and the plurality of features associated with a respective entity having feature weighting parameters, wherein an instance of the plurality of features is associated with individual entity instances;
    applying a fault label for an ensemble entity;
    linking the plurality of features using the feature weighting parameter and the entity weighting parameter with a bilinear model as processed by an analysis device;
    estimating weighting values for the entity weighting parameters and the feature weighting parameters for use in a statistical model;
    finding meaningful feature parameters in the statistical model that are likely to be responsible for entity faults; and
    reporting the entities and features estimated to be responsible for faults associated with the fault label.

2. The method as in claim 1, further comprising computing a false alarm probability for reported causes of entity faults as a number representing a fraction of parameters reported to be significant that are false alarms.

3. The method of claim 2, further comprising displaying the entities and features responsible for faults associated with the fault label along with a false alarm probability on a display output.

4. The method as in claim 1, wherein the feature weight parameters are defined by a combination of i) the entity weight parameter obtained from a respective associated entity, and ii) the feature weight parameter as linked together with other feature weight parameters of the same type for each of the entities being diagnosed.

5. The method as in claim 1, wherein finding meaningful feature parameters in the statistical model that are likely to be responsible for the faults, further comprises: finding the meaningful feature parameters in the statistical model using resampling of labeled data.

6. The method as in claim 5, wherein the resampling of the parameters further comprises: resampling of labeled data using bootstrap resampling with replacement to obtain a distribution over whether a given parameter is a cause of a labeled problem.

7. The method as in claim 6, wherein the step of finding the meaningful feature parameters with bootstrap resampling, comprises:
    obtaining a first population over the parameter values using the bootstrap resampling to resample data with true labels;
    obtaining a second population over the parameter values using null distributions; and
    comparing the first and second populations to determine a probability the first and second populations are coming from different distributions.

8. The method as in claim 7, wherein comparing the first and second populations to determine whether the first and second populations are coming from different distributions is performed using a statistical test.

9. The method as in claim 1, wherein the statistical model comprises using bilinear logistic regression.

10. The method as in claim 1, wherein each of the features are performance counters.

11. The method as in claim 1, wherein the entity weighting parameters and the plurality of features are stored in a computer memory or computer readable storage medium.

12. A method for diagnosing problem causes in a complex computing environment by using a set of labeled data and factorization of a plurality of performance features, comprising:
    identifying a plurality of computing devices having device weighting parameters, and the plurality of performance indication features associated with the respective computing device having feature weighting parameters, wherein an instance of the plurality of performance indication features is associated with an individual computing device and is stored in a computer memory;
    applying a fault label for an ensemble grouping of at least one computing device;
    linking the plurality of performance indication features using the feature weighting parameter and the device weighting parameter by applying a bilinear model using an analysis device in communication with the complex computing network;
    estimating weighting values for the device weighting parameters and the feature weighting parameters for use in a statistical model;
    finding meaningful feature parameters in the statistical model that are likely to be responsible for device faults; and
    reporting the computing devices and performance features estimated to be responsible for faults associated with the fault label.

13. The method as in claim 12, further comprising reporting the computing devices and performance features responsible for faults associated with the fault label, along with a computed false alarm probability for reported causes of entity faults representing a fraction of parameters reported as significant that are expected to be false alarms.

14. The method as in claim 12, wherein finding meaningful feature parameters in the statistical model that are likely to be responsible for the faults, further comprises: finding the meaningful feature parameters in the statistical model using bootstrap resampling with replacement to obtain parameter distributions for statistical comparison.

15. The method as in claim 12, wherein the statistical model is bilinear logistic regression.

16. A system for diagnosing problem causes in a datacenter having computing devices using a set of labeled data and factorization of a plurality of performance indication features, comprising:
    a discovery module configured to identify the computing devices and associated device weighting parameters, and the plurality of performance indication features associated with a respective computing device having performance feature weighting parameters, wherein each computing device has an instance of the plurality of performance indication features;

a fault module configured to apply a fault label for an ensemble grouping having at least one computing device;

a factorization module configured to link the plurality of performance indication features using the feature weighting parameter and the device weighting parameter by applying a bilinear model using an analysis device having a processor; and a statistical module configured to 1) estimate weighting values for the device weighting parameters and the feature weighting parameters for use in a statistical model and 2) find meaningful feature parameters in the statistical model that have a probability of being responsible for device faults using the analysis device having the processor.

17. A system as in claim 16, further comprising a display device configured to display the computing devices and performance features estimated to be responsible for faults associated with the fault label.

18. A system as in claim 17, further comprising a false alarm module configured to compute a false alarm probability for reported causes of computing device faults as a fraction representing the fraction of meaningful feature parameters expected to be false alarms.

19. A system as in claim 17, further comprising a bilinear logistic regression module configured to find meaningful parameter values using resampling.

20. A system as in claim 17, further comprising a parameter significance module configured to find meaningful feature parameters in the statistical model using resampling of labeled data using bootstrap resampling with replacement to obtain a distribution over whether a given parameter is a cause of a labeled problem.

* * * * *